US007500150B2

(12) United States Patent
Sharma et al.

(10) Patent No.: US 7,500,150 B2
(45) Date of Patent: *Mar. 3, 2009

(54) DETERMINING THE LEVEL OF AVAILABILITY OF A COMPUTING RESOURCE

(75) Inventors: Sanjiv Sharma, Bellevue, WA (US); Karri Alexion-Tiernan, Fall City, WA (US); Jeff Graves, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 396 days.

This patent is subject to a terminal disclaimer.

(21) Appl. No.: 11/323,888

(22) Filed: Dec. 30, 2005

(65) Prior Publication Data

US 2007/0174840 A1    Jul. 26, 2007

(51) Int. Cl.
    *G06F 11/00* (2006.01)
(52) U.S. Cl. .................. 714/39; 718/104; 714/55
(58) Field of Classification Search .......... 714/39, 714/55; 718/104
    See application file for complete search history.

(56) References Cited

U.S. PATENT DOCUMENTS 5,790,431 A * 8/1998 Ahrens et al. ............... 718/104
6,594,786 B1 * 7/2003 Connelly et al. ............. 714/50
7,149,917 B2 * 12/2006 Huang et al. ................. 714/4
7,185,231 B2 * 2/2007 Mullally et al. ............ 714/38
7,197,447 B2 * 3/2007 Susskind ..................... 703/22
7,213,179 B2 * 5/2007 Song et al. .................. 714/48
7,302,477 B2 * 11/2007 Kline ........................ 709/223
2004/0230858 A1   11/2004 Susskind
2007/0156733 A1 * 7/2007 Meyerson ................... 707/101

OTHER PUBLICATIONS

Adi et al., Amit—The Situation Manager, The VLDB Journal—The International Journal on Very Large Data Bases, vol. 13 Issue 2, May 2004, pp. 177-203, Springer-Verlag New York, Inc.

* cited by examiner

*Primary Examiner*—Christopher S McCarthy

(57) ABSTRACT

Data is collected relating to the availability of a computing resource such as data identifying a start event that indicates that the computing resource became available for use and data identifying a stop event that indicates that the computing resource became unavailable for use. The data relating to the availability of the computing resource is processed to determine the outage time for the computing resource during a period of time, such as a 24-hour period. The outage time is then utilized to calculate the level of availability for the computing resource during the period of time.

20 Claims, 9 Drawing Sheets

| DAY | TIME | EVENT CODE | ROLE | START / STOP |
|---|---|---|---|---|
| 1 | 11:00 | 9539 | MAILBOX | STOP |
| 1 | 12:00 | 9539 | MAILBOX | STOP |
| 1 | 14:00 | 6006 | SYSTEM | STOP |
| 1 | 16:00 | 6005 | SYSTEM | START |
| 1 | 18:00 | 9523 | MAILBOX | START |
| 1 | 21:00 | 9523 | MAILBOX | START |
| 1 | 22:00 | 1001 | SYSTEM | START |
| 1 | 23:00 | 9539 | MAILBOX | STOP |

2 MAILBOX STORES
1 PUBLIC FOLDER STORE

*Fig. 6A*

| DAY | TIME | EVENT CODE | ROLE | START / STOP |
|---|---|---|---|---|
| 1 | 12:00 | 7036 | OWA | STOP |
| 1 | 13:00 | 7036 | OWA | STOP |
| 2 | 14:00 | 7036 | OWA | START |
| 2 | 16:00 | 7036 | OWA | START |

PIM WEB ACCESS SERVER

*Fig. 6B*

| DAY | TIME | EVENT CODE | ROLE | START / STOP |
|---|---|---|---|---|
| 1 | 14:00 | 6006 | SYSTEM | STOP |
| 1 | 16:00 | 6006 | SYSTEM | STOP |
| 2 | 05:00 | 6005 | SYSTEM | START |
| 2 | 13:00 | 6005 | SYSTEM | START |

INTERNET GATEWAY/
BRIDGEHEAD SERVER

*Fig. 6C*

DETERMINING THE LEVEL OF AVAILABILITY OF A COMPUTING RESOURCE

CROSS-REFERENCE TO RELATED APPLICATIONS

This application is related to U.S. patent application Ser. No. 11/322,316 entitled "Calcuating Cluster Availability," which is being filed concurrently herewith, and which is expressly incorporated herein in its entirety.

BACKGROUND

Information technology ("IT") professionals are increasingly being requested to demonstrate the level of availability of the computing resources they manage. For instance, an IT manager may be requested by company management to demonstrate the level of availability of the company's mail servers, file stores, world wide web ("WWW" or "web") servers, gateway servers, application programs, or other computing resources. The level of availability for a computing resource refers to the time during each day, or other period of time, that the computing resource is operating and available for use.

The importance of being able to demonstrate the level of availability for computing resources is becoming more important for a variety of reasons. For one, computing resources now more than ever are expected to be readily available to users. For this reason, IT managers are being asked with greater regularity to achieve availability of the computing resources they manage 99.999% of the time (this is referred to in the IT industry as achieving "five 9's"). Without accurate statistics regarding the level of availability being achieved, it is difficult for an IT manager to achieve five 9's.

Another reason IT managers are being asked to demonstrate the level of availability for the systems they manage stems from the increased popularity of electronic mail ("e-mail") and messaging service hosting providers. Service hosting providers own and manage the computing resources necessary to provide a computing service to users, such as e-mail, and charge users for the provision of the service. As the customers of hosting providers become more sophisticated, they are more commonly interested in having detailed information regarding the level of service they are receiving from their provider. This information may be used to set service level requirements in a service level agreement ("SLA") between the hosting provider and the customer, and to determine whether the specified service levels are actually being met. Additionally, some customers want to include financial penalties in the SLA for the provider's failure to achieve specified availability levels. Because it is currently difficult for service providers to generate the necessary system availability level metrics, the inclusion of these metrics in an SLA and the prospect of financial penalties for failing to meet the metrics are challenging propositions for both the hosting service provider and the customer. In many cases, decisions are being made in this regard based upon a perception of system availability level rather than on actual data.

In the past, system level availability metrics have generally been calculated manually using spreadsheet application programs, custom-built spreadsheets, and information from various non-standard sources. While calculating these metrics manually can provide some useful information regarding system availability, calculating availability metrics in this manner suffers from a number of potentially serious drawbacks. For instance, availability calculations are often custom created within each organization without a standard mechanism for deriving system level availability. As a result, it is frequently difficult to understand whether the calculations are correct, to understand exactly what the calculated results mean, and to meaningfully compare availability calculations generated within different organizations. Additionally, manually calculating availability metrics can be a time intensive task literally taking hours each month. This can be expensive and particularly frustrating for a time-strapped IT manager. Moreover, the manual calculation of the availability metrics is likely to generate incorrect results. Incorrect system availability level metrics can result in erroneous and inconsistent reporting, incorrect data for setting service levels, penalties for failing to meet the service levels specified in an SLA, resources being allocated to incorrect areas, and poor perception of system performance, among other problems.

It is with respect to these considerations and others that aspects of a computing system for determining the availability of a computing resource are described below.

SUMMARY

Systems, methods, and computer-readable media are provided for calculating the availability of a computing resource. Data is collected relating to the availability of the computing resource. Data relating to the availability of the computing resource may include data identifying a start event that indicates that the computing resource became available for use and data identifying a stop event that indicates that the computing resource became unavailable for use. The data relating to the availability of the computing resource is processed to determine the outage time for the computing resource during a period of time, such as a 24-hour period. The outage time is then utilized to calculate the level of availability for the computing resource during the period of time.

In order to determine the outage time for the computing resource, the collected data is parsed to identify corresponding stop events and start events. When corresponding stop events and start events are identified that occurred during the same time period, the amount of time between a corresponding stop event and a start event is added to the outage for the computing resource for the time period. If a start event is identified during the time period without a corresponding stop event, the outage time is computed as the time equal to the time period between the end of a previous time period and the time of the start event. If a stop event is identified during the time period without a corresponding start event, the outage time is computed as the time equal to the time between the stop event and the end of the time period. Where a stop event is identified without a corresponding start event, the stop event is also flagged so that any outage as a result of the stop event in future time periods can be computed.

A monitoring and collection agent may be utilized to monitor for and collect data about events relating to the availability of the computing resource. If no start or stop events are detected during a time period, a determination may be made as to whether the agent for the computing resource was operational during the time period. If the agent was operational, no outage for the computing resource is incurred during the time period. If the agent was not operational, the computing resource is considered to have been inoperative during the entire time period.

A request for a report containing the results of the availability calculation may also be received. Availability metrics for computing resources serving the same role may be combined, averaged, and included in an availability report. Additionally, a date region for formatting date values contained in the report may be determined. The date region specifies how a date should be formatted for the region in which the requesting user is located. Date values contained in the availability report are then formatted according to the determined date region. The availability report is provided in response to the request.

An extensible database schema is also provided for use in storing data related to the availability of a computing resource. The database schema defines fact and dimension tables for inbound data, outbound data, and reporting data. The database schema may be extended through the addition of dimensions or dimension attributes to any of the tables. New dimension attributes may also be added to existing dimensions. The extensible database schema is embodied as a database stored on a computer-readable medium, such as a memory or computer disk.

The above-described subject matter may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 6A-6C are data structure diagrams that graphically illustrate how the availability of a computing resource is calculated with reference to several sets of example availability data;

DETAILED DESCRIPTION

The following detailed description is directed to systems, methods, and computer-readable media that calculate availability metrics for a computing resource. While the subject matter described herein is presented in the general context of program modules that execute in conjunction with the execution of an operating system on a computer system, those skilled in the art will recognize that other implementations may be performed in combination with other program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

Figure 1:
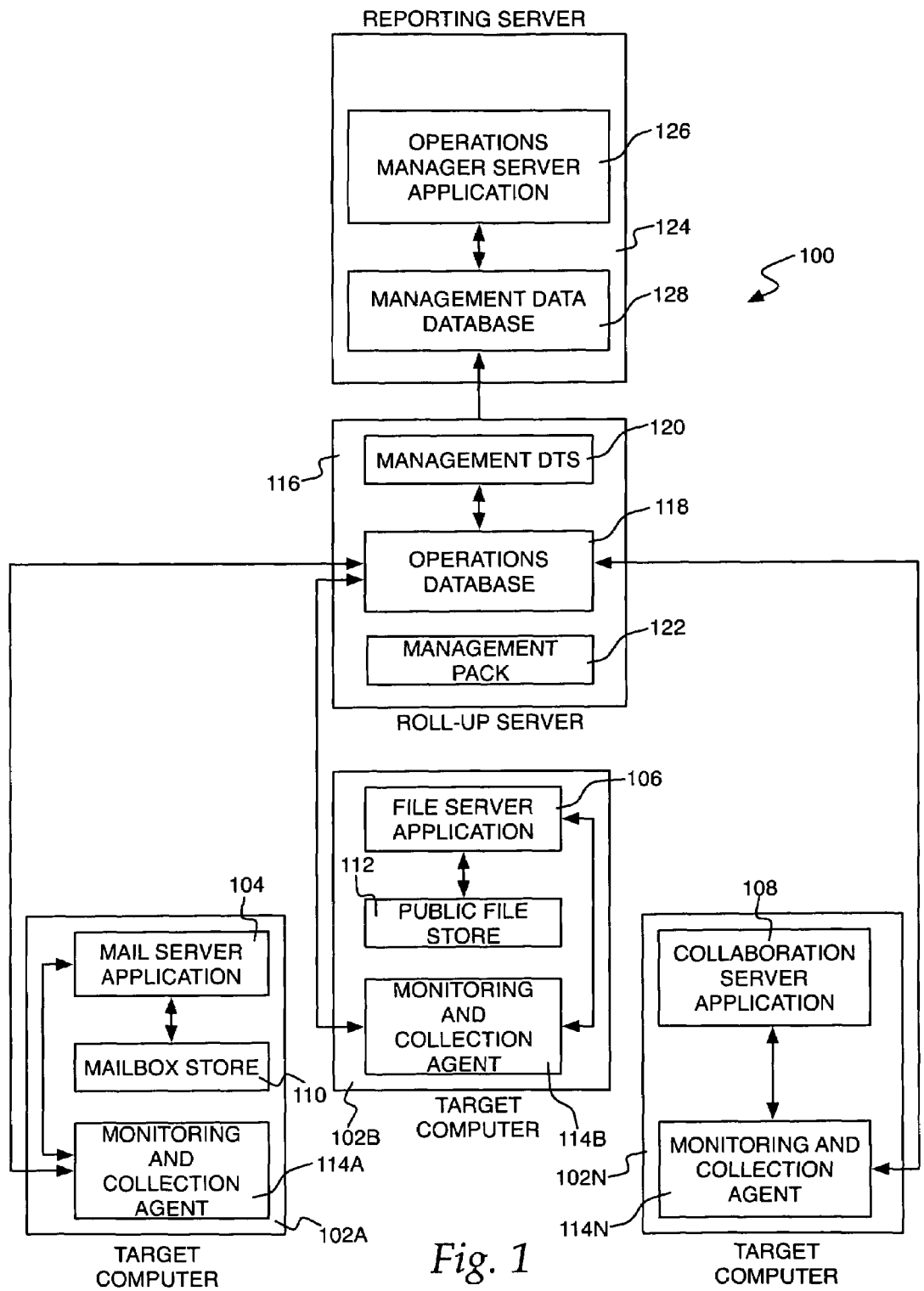
FIG. 1 is a computer system diagram showing aspects of an illustrative system for collecting data regarding the availability of a computing resource.

In the following detailed description, references are made to the accompanying drawings that form a part hereof, and which are shown by way of illustration specific embodiments or examples. Referring now to the drawings, in which like numerals represent like elements through the several figures, aspects of a system for collecting data regarding the availability of a computing resource will be described. In particular, FIG. 1 shows aspects of an illustrative system 100 for collecting data regarding the availability of a computing resource. A computing resource is any resource provided by a computing system. For instance, a computing resource may include a mail server, a file store, a web server, a gateway server, an application program, a messaging application program, a collaboration application, a calendaring program, a print server, and virtually any other type of resource provided by a computing system. It should be appreciated that a single computer may provide multiple resources and that the availability of resources provided by a single computer may be calculated on an individual basis in the manner described herein. Additionally, as will be described in greater detail below, the calculated availability for a group of computing resources serving the same role may be combined and averaged to provide an availability for all resources having the role.

In the example system 100 shown in FIG. 1, the target computers 102A-102N provide the computing resources for which availability is being calculated. In particular, the target computer 102A is operative to provide a mail server application program 104 and a mailbox store 110 for storing electronic mail messages and related information. Although not shown in FIG. 1, the target computer 102A is operative to receive and respond to requests from client computers for accessing the mail server application 104 and the mailbox store 110. The mail server application 104 and the mailbox store 110 are considered to be available when a client computer can access these computing resources. The target computer 102B is similarly equipped to provide access to a public file store 112 through a file server application 106. Likewise, the target computer 102N is operative to provide collaboration services through a collaboration server application 108.

It should be appreciated that although three target computers 102A-102N are illustrated in FIG. 1, the availability of any number of computer systems may be calculated as described herein. It should also be appreciated that the computing resources provided by the target computers 102A-102N are merely illustrative and that other computing resources may be provided.

Each of the target computers 102A-102N is also equipped with a monitoring and collection agent (also referred to herein as an "agent") 114A-114N, respectively. The monitoring and collection agents 114A-114N are operative to monitor the operation of the associated target computer and to collect data regarding the occurrence of any events on the associated target computer related to the availability of a computing resource provided by the target computer. For instance, the monitoring and collection agent 114A monitors the operation of the mail server application 104 and collects data relating to its availability. In this regard, events may be generated by the application 104 that are collected and recorded by the agent 114A. Start events (also referred to as "up" events) may be generated indicating that the computing resource has become available for use. Stop events (also referred to as "down" events) may also be generated indicating that the computing resource has become unavailable for use. The agent 114A operates as a "sink" for these events and collects them as they are received. It should be appreciated that an operating system executing on the target computer 102A may also generate start and stop events relating to the overall availability of the target computer 102A. These events may also be collected and recorded by the agent 114A.

As the monitoring and collection agents 114A-114N collect data relating to the availability of the various computing resources, they transmit this information to a roll-up server 116 in near real time. In particular, the collected availability data is stored by the agents 114A-114N in an operations database 118 maintained by the roll-up server 116. The availability data is maintained in the operations database 118 for a period of time until it is moved to a management data database by a management data transformation service ("DTS") 120. The management DTS 120 is a stored procedure for moving the collected availability data from the operations database 118 to the management data database 128. In one implementation, the management DTS 120 is operative to move the collected data to the management data database 128 once per day at midnight. However, the data may be moved at other times and at other frequencies.

The management data database 128 is stored at a reporting server computer 124. The reporting server 124 is operative to execute an operations manager server application 126. The operations manager server application 126 is operative to provide functionality for monitoring and managing server computers. According to one implementation, the operations manager server application 126 comprises the MICROSOFT OPERATIONS MANAGER ("MOM") 2005 server monitoring and management application from MICROSOFT CORPORATION of Redmond, Wash. It should be appreciated, however, that server monitoring and management packages from other vendors may be utilized to collect the computing resource availability data for use in the manner described herein. It should also be appreciated that, in addition to the collected availability data, the management data database 128 is also utilized to store other types of data regarding the operation and management of one or more server computers.

As will be described in greater detail below, the reporting server 124 is also operative to store and execute software components for extracting the relevant availability data from the database 128, computing the outage time for one or more computing resources, and, based on the outage time, to compute the availability for the computing resources. The outage time refers to the amount of time during a specified time period (a 24-hour time period, for instance) that the computing resource was not available. In an alternative implementation referred to herein as a "split" installation, the software components for performing these functions may reside on a database server computer other than the server 124. An installation wherein the availability calculation components reside and execute on the reporting server 124 is referred to herein as a "local" installation. By utilizing a split installation, the software components for performing the availability calculations may reside and execute on a computer system other than the reporting server 124 thereby freeing resources on the server 124.

As shown in FIG. 1, the server 116 is also operative to store a management pack 122. The management pack 122 includes rules that define the events and other performance data relating to availability that should be collected by the agents 114A-114N. For instance, specific rules may be defined identifying the specific events that should be collected for the mail server application 104, the mailbox store 110, the file server application 106, the public file store 112, the collaboration server application 108, and virtually any other type of computing resource. Once the management pack 122 is imported onto the server 116, the rules are associated with the relevant target computers 102A-102N and transmitted to these computer systems. In this manner, the agents 114A-114N receive the rules that define the availability data that should be monitored and collected. It should be appreciated that aspects of the rules may be modified by a system administrator, such as the frequency of data collection and other aspects.

Figure 2:
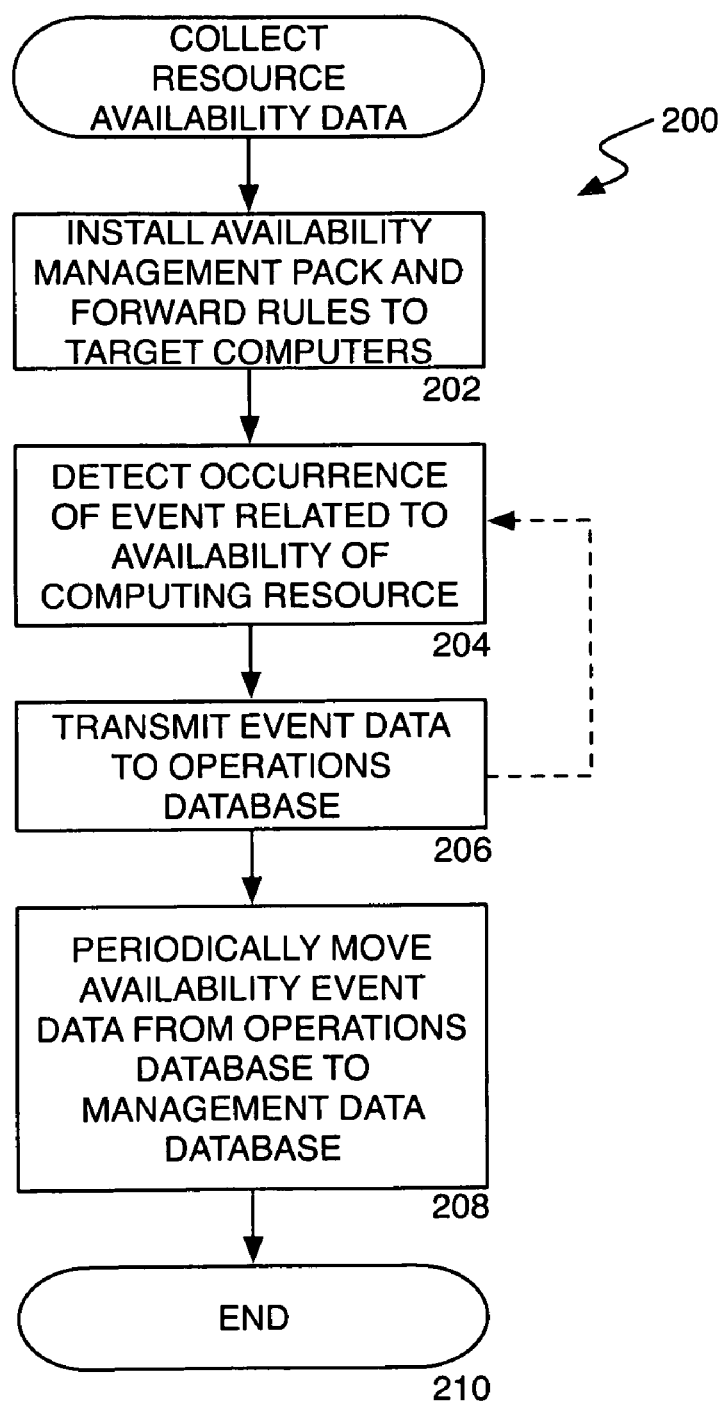
FIG. 2 is a flow diagram showing an illustrative process for collecting data relating to the availability of a computing resource.

Turning now to FIG. 2, an illustrative routine 200 will be described showing the operation of the computer system 100 for collecting and storing data related to the availability of a computing resource. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein with respect to are referred to variously as operations, structural devices, acts, or modules. These operations, structural devices, acts and modules may be implemented in software, in firmware, in special purpose digital logic, and any combination.

The routine 200 begins at processing operation 202, where the management pack 122 is installed on the server computer 116. As discussed above, the rules defining the availability data that should be collected by the target computers 102A-102N are contained in the management pack 122. These rules are associated with the appropriate target computers 102A-102N and forwarded to the appropriate target computer. Once received at the target computers 102A-102N, the rules are used by the agents 114A-114N to identify and collect events relating to the availability of the various computing resources. From processing operation 202, the routine 200 continues to processing operation 204.

At processing operation 204, the agents 114A-114C monitor the operation of the respective target computer 102A-102N to detect the occurrence of any event relating to the availability of a computing resource. When an event is detected, the agents 114A-114N record the event and transmit data identifying the event to the operations database 118. The data identifying the event may include the date and time the event occurred, an event code that identifies the computing resource and whether the event was a start event or a stop event, and other information. This data is stored in the operations database until such time as the management DTS 120 moves the data to the management data database 128. This occurs at processing operation 206. It should be appreciated that the processing operations 204 and 206 are performed repeatedly by each agent 114A-114N during program execution to capture availability data and move the data to the operations database 118.

From processing operation 206, the routine 200 continues to processing operation 208, where the management DTS 120 moves the collected availability data to the management data database 128. As discussed above, the management DTS 120 operates periodically to perform this function. For instance, in an implementation, the management DTS 120 moves the availability data to the management data database 128 each night at midnight. Other times and frequencies may be utilized by the management DTS. As will also be described in greater detail below, once the availability data has been moved into the management data database 128, this data may be utilized to calculated the availability for the various computing resources provided by the target computers 102A-102N. Additional details regarding this process are provided below with respect to FIGS. 3-8. From operation 208, the routine 200 continues to operation 210, where it ends.

Figure 3:
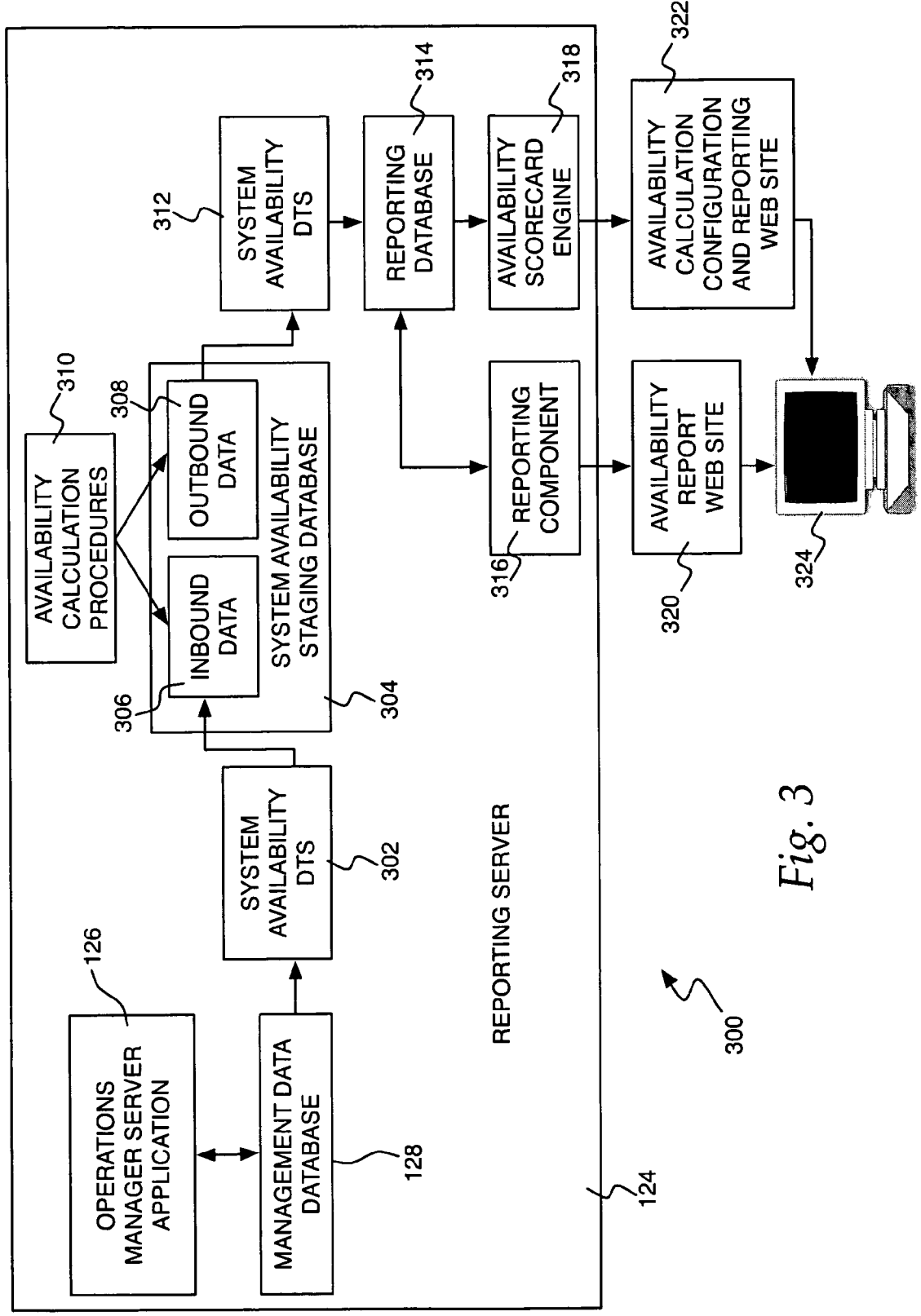
FIG. 3 is a computer system diagram showing aspects of an illustrative system for calculating the availability of a computing resource.

Turning now to FIG. 3, a computer system diagram showing aspects of an illustrative system 300 for calculating the availability of a computing resource will be described. The system 300 comprises a local installation of the various software components necessary to calculate system availability as described herein on the reporting server 124. As mentioned above, however, the various software components may be installed and executed on a server computer other than the reporting server 124 utilizing a split installation.

As shown in FIG. 3, a system availability DTS 302 is operative to periodically extract the availability data from the management data database 128 and to store the availability data in an inbound data table 306 within a system availability staging database 304. According to an implementation, the system availability DTS 302 executes once per day at midnight to perform this function. Other times and frequencies may also be utilized by the system availability DTS 302. It should be appreciated that, in other implementations, the availability data may be utilized directly from within the management data database 128 without copying the data to the system availability staging database 304.

Once the availability data has been copied to the staging database 304, the availability calculation procedures 310 are executed to perform the actual availability calculations described herein. According to one implementation, the procedures 310 are executed once per day and perform the availability calculations on the availability data for one day. Availability metrics for other time periods can then be calculated based on the calculated daily availability numbers. It should be appreciated that other time periods may be utilized for executing the procedures 310 and that availability data for other time periods may be utilized in the calculations. Once the availability calculations have been performed by the procedures 310, the results are stored in the outbound data table 308.

The system availability DTS 312 periodically copies the results from the outbound data table 308 to the reporting database 314. The reporting database 314 contains the results of the availability calculations. In particular, the reporting database 314 contains data identifying the availability results for individual computing resource, such as the resource name, resource role, date, outage duration, and calculated availability number. When requests for availability reports are received, the availability numbers for resources having the same role may be combined and averaged to provide an availability figure for all of the resources sharing the same role. For instance, the availability for all mail servers may be computed and viewed in this manner. Because the availability calculations have been performed prior to report generation, other than grouping by resource role, reports can be generated quickly.

In order to enable access to reports containing the calculated availability figures, a reporting component 316 is provided. The reporting component 316 provides an availability report web site 320 that contains simple availability reports. No configuration of the availability calculation process is enabled through the availability report web site 320. In this manner, an end user can access the calculated availability metrics using a client computer 324.

An availability scorecard engine 318 is also installed for providing a more robust availability calculation configuration and reporting web site 322. The web site 322 allows greater customization of the availability calculation process described herein and may be utilized, for instance, by an IT manager through the client computer 324. It should be appreciated that while the reports described herein are provided through web sites, many other means may be utilized for reporting the calculated availability numbers. For instance, the calculated metrics may be printed, e-mailed, text messaged, or provided to users of the system 300 in virtually any manner.

The scorecard engine 318 also allows an IT manager to define resource roles, define the in service and out of service dates for the resource, and the particular resources on a given server. This data may be taken into account during the availability calculations described below. Users may also categorize outages as planned, unplanned, approved, or unapproved. Depending upon the categorization, the outage may or may not be taken into account in the availability calculation. Additional details regarding the processing of the availability data, including computing the availability for a resource and for receiving and responding to requests for availability reports will be described below with respect to FIGS. 4-8.

According to one implementation, the various software components illustrated in FIG. 3 for calculating the availability of a computing resource are packed into a single installer for installation on the server 300. The installer package includes program code for ensuring that any required dependencies have been satisfied prior to installing the various software components. For instance, according to one implementation, installer ensures that the operating system version is correct, that various necessary frameworks are installed, that the appropriate database server application is installed, and that the operations management server application 126 is installed. If any of these prerequisites are not satisfied, the installer will not complete the installation of the various software components shown in FIG. 3. The installer also includes program code for performing both split and local installs of the various software components.

Figure 4:
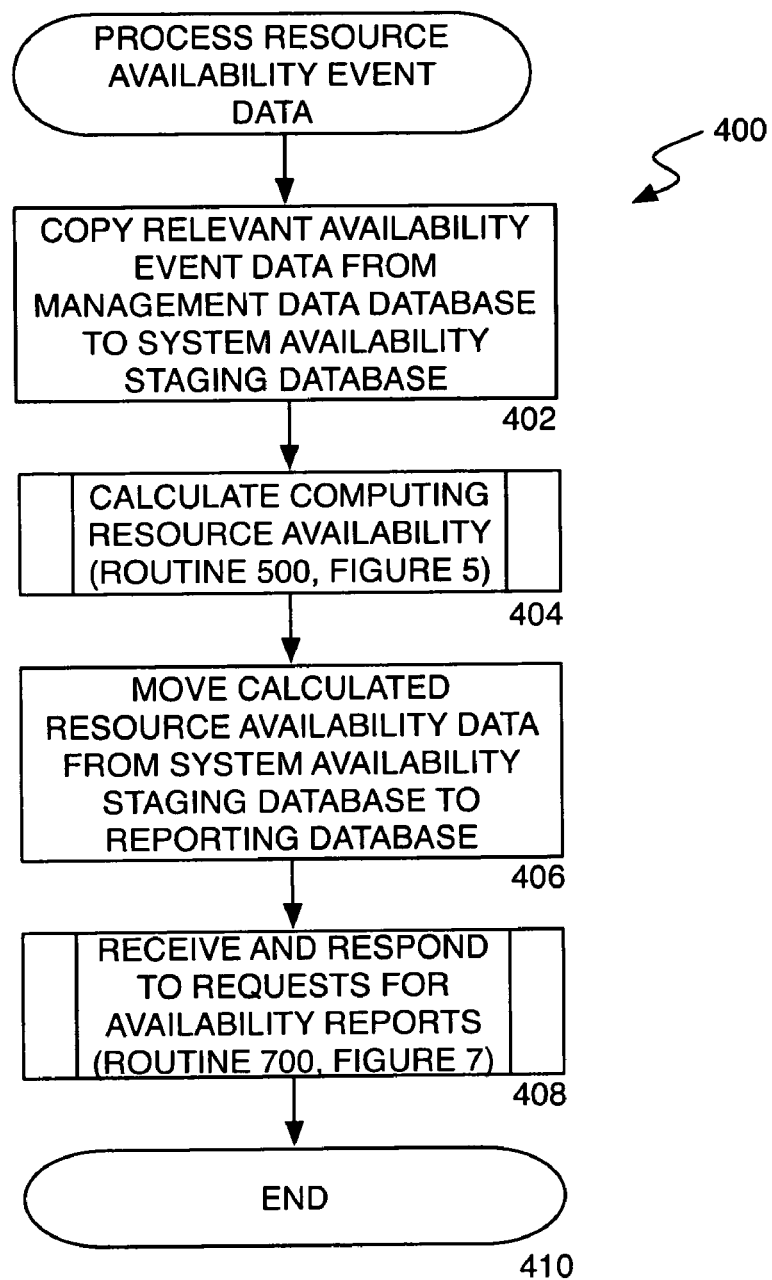
FIG. 4 is a flow diagram showing an illustrative process for processing data relating to the availability of a computing resource.

Referring now to FIG. 4, a flow diagram showing an illustrative routine 400 for processing data relating to the availability of a computing resource will be described. In particular, the routine 400 begins at operation 402, where the system availability DTS 302 copies the relevant availability data from the management data database 128 to the staging database 304. At processing operation 404, the procedures 310 calculate the availability for the various computing resources.

Figure 5:
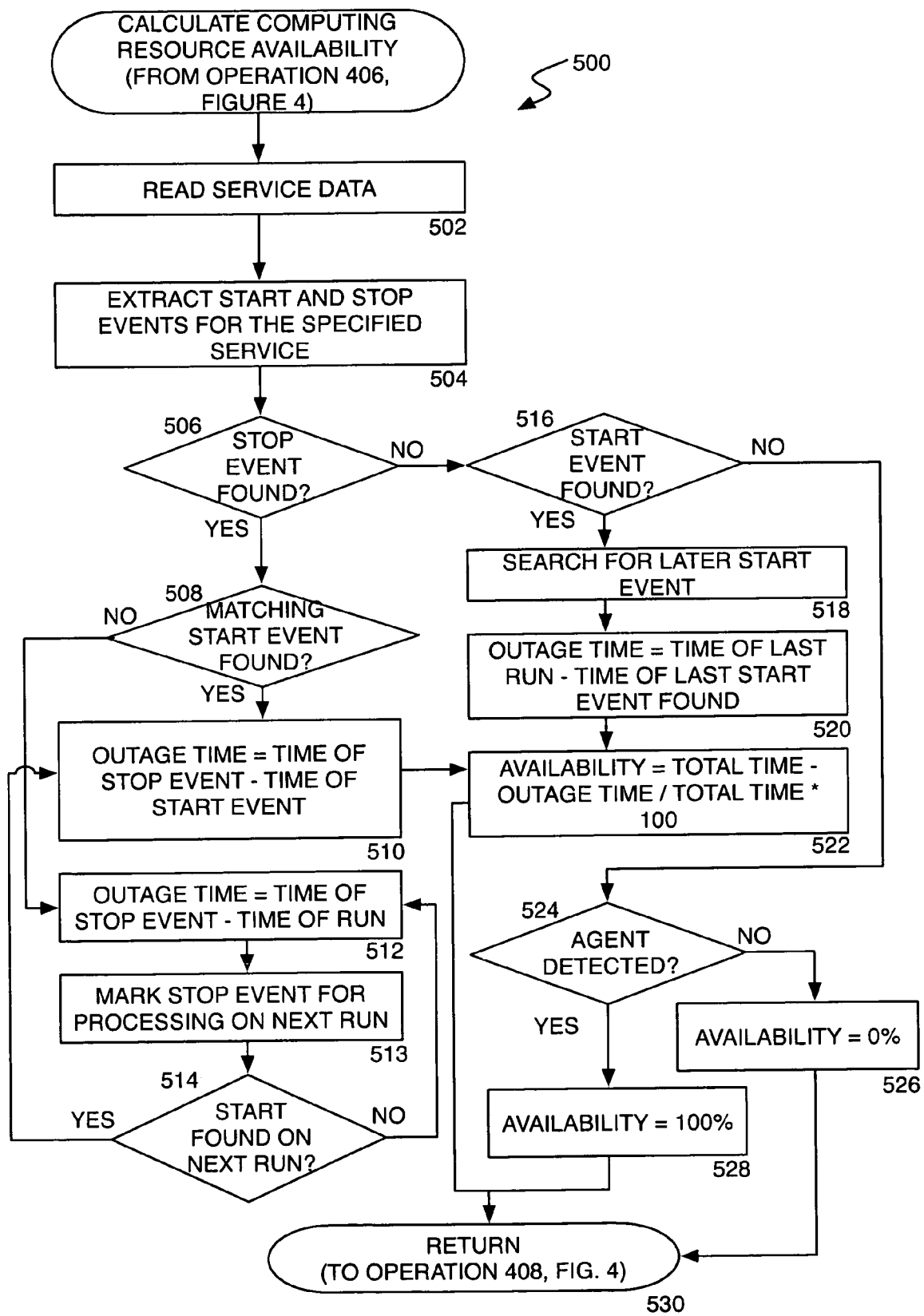
FIG. 5 is a flow diagram showing an illustrative process for calculating the availability of a computing resource.

An illustrative routine 500 will be described below with respect to FIG. 5 illustrating the processing performed by the procedures 310 in this regard.

From processing operation 404, the routine 400 continues to processing operating 406, where the system availability DTS 312 copies the calculated availability results from the staging database 304 to the reporting database 314. The routine 400 then continues to processing operation 408, where the reporting component 316 and the scorecard engine 318 receive and respond to requests for reports containing the calculated availability metrics. An illustrative routine 700 will be described below with respect to FIG. 7 for processing requests for an availability report. From processing operation 408, the routine 400 continues to operation 410, where it ends.

Turning now to FIG. 5, a flow diagram showing an illustrative routine 500 for calculating the availability of a computing resource will be described. In particular, the routine 500 begins at operation 502, where service data is read from within configuration tables on the reporting server 124. The service data identifies the resources for which availability should be calculated and the data that should be utilized in the calculations. For instance, the service data may identify the various start and stop events that should be collected and utilized to calculate the availability of a particular resource, such as a mailbox.

From operation 502, the routine 500 continues to operation 504, where the availability data for the specified resource is extracted from the staging database 304. This includes, for instance, extracting all of the data describing the start and stop events for the resource during the reporting time period. Once the data has been extracted from the staging database 304, each of the start and stop events are parsed in an attempt to correlate the start and stop events to quantify any service outages. This process begins at decision operation 506 and is described below.

At decision operation 506, a determination is made as to whether a stop event has been encountered. If a stop event has been encountered, the routine 500 continues from decision operation 506 to decision operation 508. At decision operation 508, a determination is made as to whether a start event that corresponds with the stop event is also present. For instance, if the stop event indicates that a mailbox became unavailable, an attempt is made to identify a start event indicating that the mailbox later became available. If a corresponding start event is identified, the routine 500 continues from decision operation 508 to processing operation 510.

At processing operation 510, the outage time is calculated as the time between the occurrence of the stop event and the occurrence of the start event. The routine 500 then continues from processing operation 510 to processing operation 522. At processing operation 522, the availability for the resource is computed as the total time during the time period minus the outage time divided by the total time multiplied by 100. So, for example, if the elapsed time between the stop event and the start event was one hour, then the availability of the resource during a one day time period is (24−1)/24*100=95.8%. Additional examples will be discussed below with reference to FIGS. 6A-6C. From operation 522, the routine 500 continues to operation 530, where it returns.

If, at decision operation 508, no start event can be found corresponding to the stop event, the routine 500 branches from decision operation 508 to processing operation 512. At processing operation 512, the outage time is calculated as the time the stop event occurred until the time the availability calculation is performed. In the case where the calculation is performed at the end of each day, the outage time is calculated from the time of the stop event until midnight. Additionally, at operation 513, the stop event is marked for processing on the next execution of the procedures 310. On the next execution, another attempt is made to match the stop event with a start event. If no match can be made, the outage time is an entire time period. If a match can be made, then the actual outage time is calculated. This processing occurs at decision operation 514 and processing operations 510, 512, and 522, described above.

If, at decision operation 506, it is determined that a stop event was not found, the routine 500 branches to operation 516. At operation 516, a determination is made as to whether a start event was found. If a start event was found, the routine 500 continues from decision operation 516 to processing operation 518. At processing operation 518, a search is made for a later, more appropriate start event. This is performed to ensure that the most appropriate outage time is computed. For instance, a start event may be encountered indicating that a mailbox became available. However, a subsequent start event may indicate that the server hosting the mailbox did not actually become available until a later time. In this case, the later start event is utilized to compute the outage time to account for the fact that although the mailbox came up, it was not truly available to users until the server became available. From operation 518, the routine 500 continues to processing operation 520.

At processing operation 520, the outage time is computed as the time of the previous execution of the calculation procedures 310 until the time of the last start event located. When the time period utilized is one day and the procedures 310 execute at midnight, for example, the outage time is calculated from midnight until the time of the last start event. From operation 520, the routine 500 continues to operation 522 where the availability for the resource is computed in the manner described above.

If, at operation 516, it is determined that a start event was not found, the routine 500 branches to decision operation 524. In this case, neither a start event nor a stop event were detected during the reporting time period. In order to determine the appropriate outage, therefore, a determination is made at decision operation 524, as to whether a heartbeat signal was detected from the agent 114 monitoring the service. The heartbeat signal is a periodic signal generated by the agent 114 to indicate whether or not it is executing properly. If no heartbeat is detected, the routine 500 branches to operation 526, where the outage time is computed as the entire time period. If a heartbeat signal is detected, the routine 500 branches from decision operation 524 to processing operation 528 where the outage time is set to zero. From processing operations 526 and 528, the routine 500 continues to operation 530, where it returns.

It should be appreciated that all of the start and stop events for the reporting time period are processed in the above manner to calculate the entire outage for the service during the time period. Once all of the outages have been identified and computed, the outage time for the entire time period is calculated and the availability for the resource during the time period can be computed. Additional examples regarding these calculations are provided below with reference to FIGS. 6A-6C.

Turning now to FIGS. 6A-6C, several data structure diagrams that include example availability data will be described. FIG. 6A shows sample availability data during one time period for a server computer hosting two mailbox stores and one public folder store. A first outage is computed for the mailbox role by matching the event code "9539" that occurred at 11:00 indicating that the mailbox became unavailable with the event code "1001" that occurred at 22:00 indicating that the system became available. A second outage is computed for the mailbox role between the time of the vent "9539" that occurred at 23:00 and the end of the day since no matching start event is present. An attempt will be made on subsequent days to match this event with a start event and to compute the resultant outage time. A first outage also occurred for the public folder store role between the event "6006" that occurred at 14:00 and the system start event "1001" that occurred at 22:00.

FIG. 6B shows availability data for two days for a server hosting a personal information manager web access server. An outage is computed for the first day of operation between the event "7036" that occurred at 12:00 until the end of the day since no matching start event was encountered during the same day. The total outage is computed on the second day based on the event "7036" at occurred at 12:00 on day one and the start event "7036" that occurred at 16:00 on day two.

FIG. 6C shows availability data for two days for a server hosting an internet gateway/bridgehead server. The outages shown in FIG. 6C are similar to those in FIG. 6B. However, it should be appreciated that the outages in FIG. 6C are calculated based upon events generated by the server computer rather than by the gateway application. In this manner, events indicating that a server computer became unavailable or available may be utilized to calculate the availability for a resource hosted by the server computer.

Figure 7:
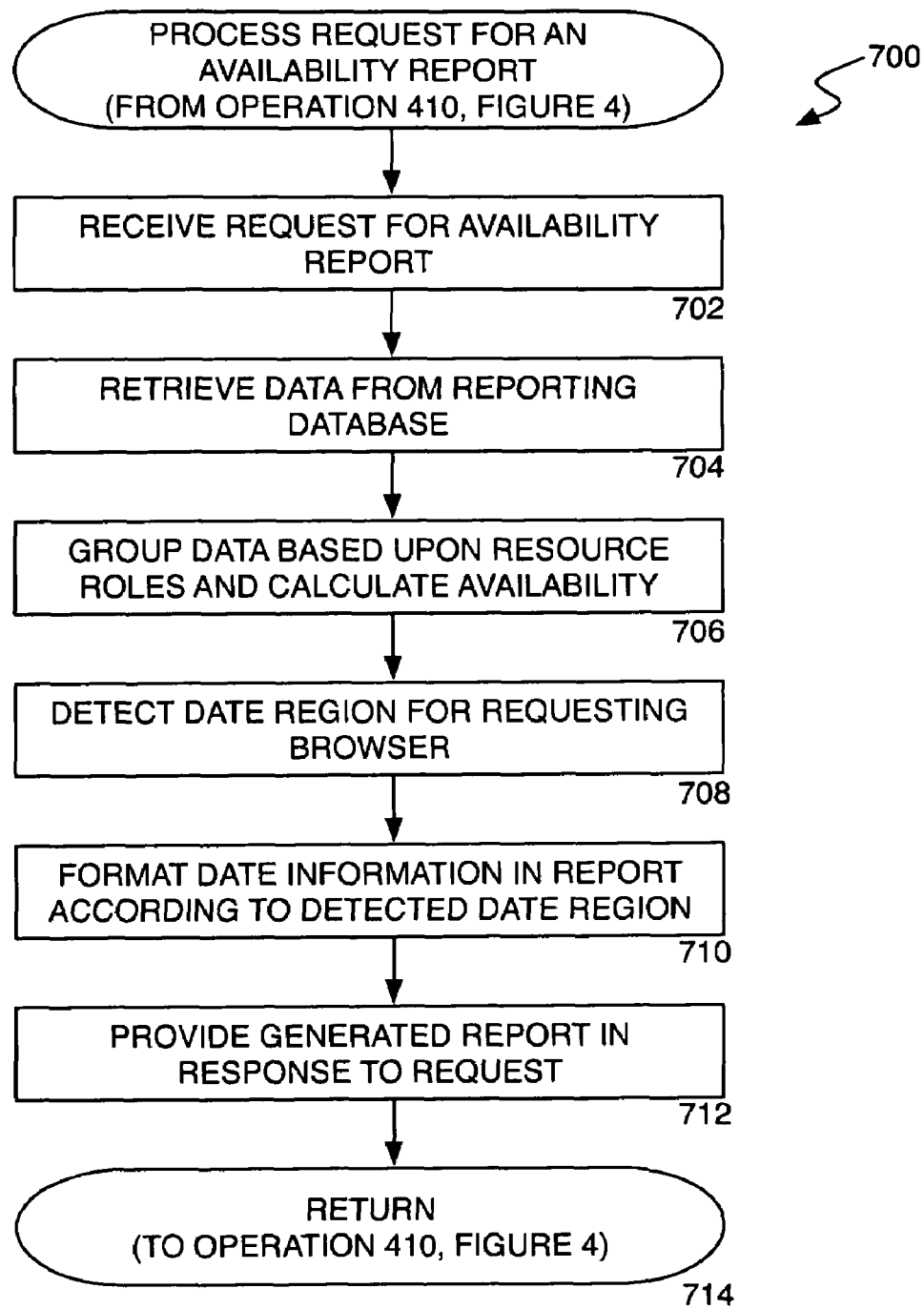
FIG. 7 is a flow diagram showing an illustrative process for processing a request for a report showing the availability of a computing resource.

Turning now to FIG. 7, a flow diagram will be described showing an illustrative routine 700 for processing a request for a report showing the availability of a computing resource. The routine 700 begins at processing operation 702, where the reporting component 316 or the availability scorecard engine 318 receives a request for a report containing the calculated availability metrics. In response to such a request, the routine 700 proceeds to processing operation 704, where the requested availability data is retrieved from the reporting database 314. Once the data has been retrieved from the database 314, the routine 700 continues to processing operation 706, where any necessary grouping of data based upon resource roles is performed and the availability for the specified role is calculated. For instance, if the requested availability data is for all mail stores during a one week period, all of the previously calculated availability data for the mail stores during the week is retrieved and averaged to provide an availability number for the specified resource role.

From processing operation 706, the routine 700 continues to operation 708, where a date region is detected from the settings of the web browser application program executing on the client computer 324. The date region defines the format that should be utilized to present dates to the user. For instance, the date region setting may indicate that dates should be presented in the format of MM/DD/YY, that dates should be presented in the format of DD/MM/YY, or in another format. Once the date region has been detected, the routine 700 continues to operation 710, where date information contained in the availability report is formatted using the detected date region. Once the date has been formatted, the routine 700 continues to operation 712, where the report is provided to the client computer 324 in response to the request. The routine 700 continues from operation 712 to operation 714, where it ends.

Figure 8:
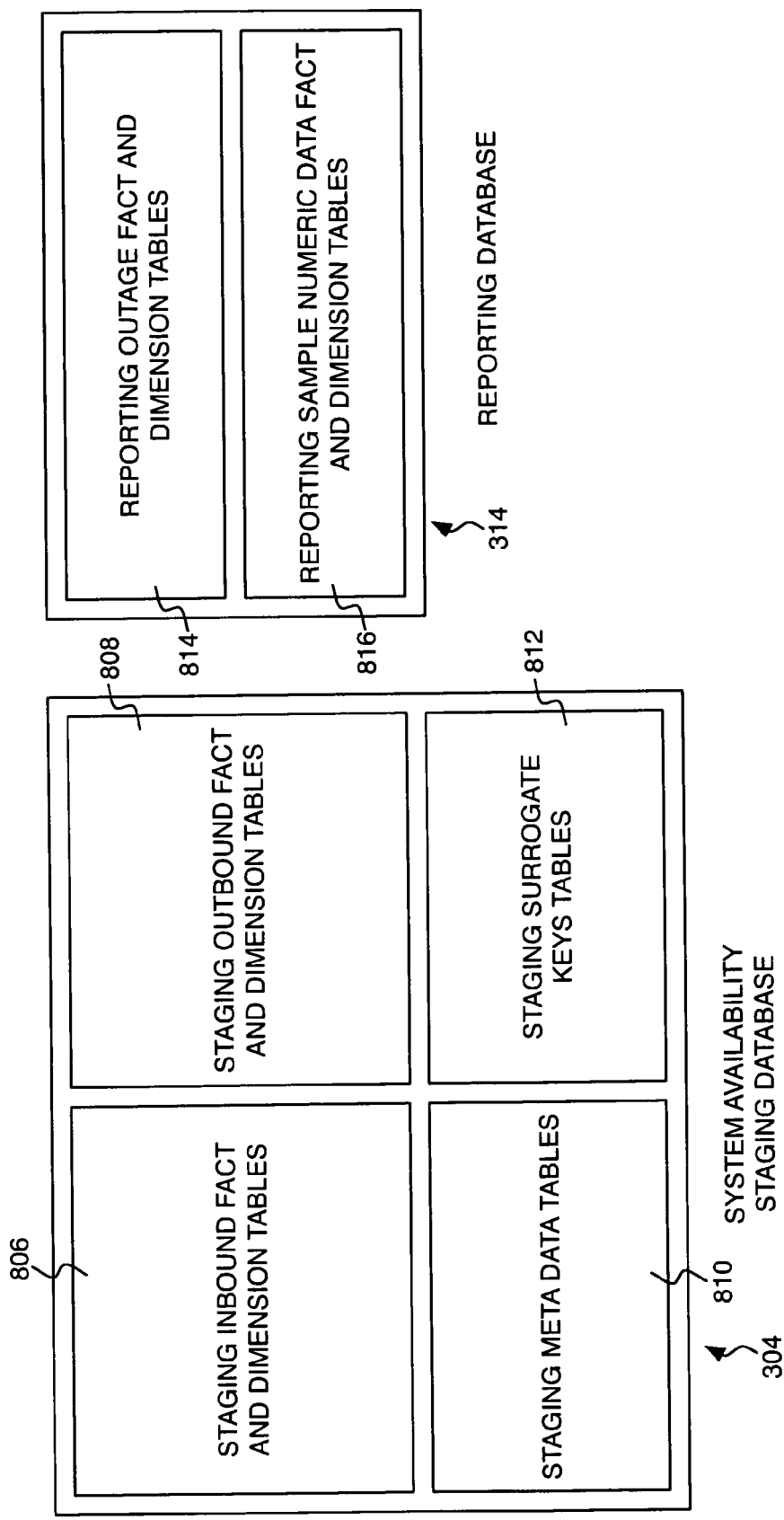
FIG. 8 is a data structure diagram showing aspects of an illustrative database schema utilized in calculating the availability of a computing resource.

FIG. 8 is a block diagram showing an abstracted high level view of an illustrative database schema utilized for storing data related to the availability of a computing resource in one implementation. A schema defines the organization or structure for a database. In the context of the methods and systems provided herein, the schema illustrated in FIG. 8 defines the organization and structure of the databases utilized by the server 124 to calculate the availability of a computing resource. The databases utilized by the server 124 may be referred to herein as a "data warehouse." A data warehouse is a central repository for all or significant parts of the data that is collected by the various business systems within an enterprise. Data from various on-line transaction processing applications ("OLTP") and other sources is selectively extracted and organized within the data warehouse databases for use by analytical applications and user queries. In the context of the methods and systems described herein for calculating the availability of a computing resource, the OLTP system is the operations database 118 and the analytical applications and user queries are the availability calculation procedures 310.

As discussed briefly above, the staging database 304 and the reporting database 314 are installed on the server 124 or another server computer. The staging database 304 includes fact and dimension tables 806 that represent an inbound area where the extracted raw event and performance data regarding availability is placed. The staging database 304 also includes fact and dimension tables 808 that hold the interim calculated availability data after the availability calculation procedures 310 are applied to the raw data in the inbound tables. In addition to the tables 806 and 808, the staging database 304 also includes meta data tables 810 and staging surrogate key tables 812. The meta data tables 810 contain information that characterizes the identity, contents, location, and relationships between tables within the staging database 304. The staging surrogate key tables 812 include surrogate keys for maintaining uniqueness within the tables of the staging database 304. The surrogate keys are also utilized as part of the delta processing performed during the extraction, transformation, and loading of the availability data.

The reporting database 314 includes fact and dimension tables that represent data as it is presented in the final availability reports. In particular, the database 314 contains two sets of fact and dimension tables, the outage fact and dimension tables 814 and the sample numeric data fact and dimension tables 816. The outage fact and dimension tables 814 include availability data for key availability metrics. The sample numeric data fact and dimension tables 816 include performance data for the servers from which availability data is collected.

In one implementation of the methods and systems described herein, the database schema is a star schema model consisting of dimension tables and fact tables. As known to those skilled in the art, a star schema is a data warehouse schema consisting of a fact table with a compound primary key, with one segment for each dimension and with additional columns of additive facts. The fact tables contain the measurements, metrics, or facts of business processes. In the implementations described herein, the fact tables contain the numbers or the values in context to various dimensions. For example, a fact table as utilized herein may contain a value (e.g. "9539") in the context of an Event ID. As another example, a fact table as utilized herein may contain a time value (e.g. "18:17:34") in the context of the Event Time.

The dimension tables contain the context or characteristics of the measurements. For example, characteristics of the value "9539" may be event, source, or time. Dimension attributes are the various columns in a dimension table. For example, in the Event dimension, the attributes can be Event Type (Stop Event or Start Event), Event Log Source (Application Log or System Log), or Event Source (Computer Name). Similarly, the Source dimension can have attributes like Source Name Table and Source View Name.

According to one implementation, the schema contains a default set of facts and dimensions. The schema as described herein can also be extended by a system administrator to define additional dimensions and attributes. For example, an additional dimension may be defined as a location that contains attributes like the geographic and regional location of the source computer. The ability to define additional dimensions and dimension attributes into the tables contained in the staging database 304 and the reporting database 314 makes the schema extensible.

According to other aspects, new dimensions and dimension attributes can be directly added as additional tables that are part of the staging database 304 or the reporting database 314. Existing dimensions can also be directly extended to include new attributes. It should be appreciated, however, that these extensibility features are typically not exposed to a user of the availability data. In order to extend the schema, an administrator must be familiar with the appropriate database programming language (SQL Server in one implementation) and can extend the schema utilizing the appropriate programming tools.

Figure 9:
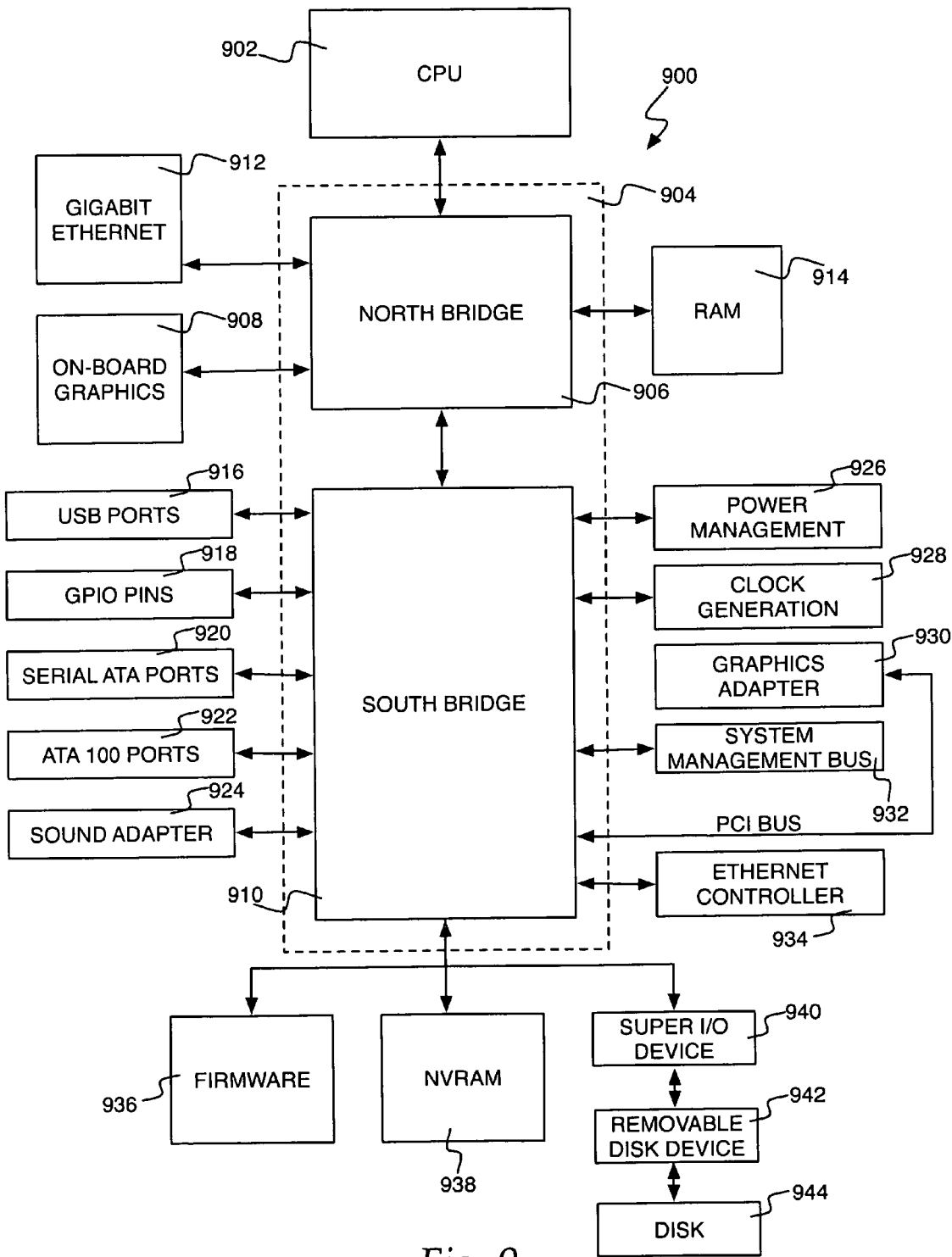
FIG. 9 is a computer architecture diagram suitable for implementing a computer system such as discussed with reference to FIGS. 1-8.

FIG. 9 and the following discussion are intended to provide a brief, general description of a suitable computing environment in which the subject matter described herein may be implemented. In particular, FIG. 9 shows an illustrative computer architecture for a computer 900. This computer architecture may be utilized to embody the computer systems illustrated in and discussed above with reference to FIGS. 1-8. For instance, the computer architecture shown in FIG. 9 may be utilized to implement the reporting server 124, the roll-up server 116, the target computers 102A-102N, the client computer 324, and any other computer systems discussed herein. It should be appreciated that although the computer architecture shown in FIG. 9 embodies a standard server computer, other types of computer architectures and computing devices may be utilized. In particular, the subject matter described herein may be utilized with a conventional desktop or "personal" computer, a laptop computer, a handheld or portable computing device, a custom hardware device, and virtually any other type of computing device.

As shown in FIG. 9, the computer 900 includes a baseboard, or "motherboard", which is a printed circuit board to which a multitude of components or devices may be connected by way of a system bus or other electrical communication path. In one implementation, a central processing unit ("CPU") 902 operates in conjunction with a chipset 904. The CPU 902 may comprise a standard central processor that performs arithmetic and logical operations necessary for the operation of the computer.

The chipset 904 includes a north bridge 906 and a south bridge 910. The north bridge 906 provides an interface between the CPU 902 and the remainder of the computer 900. The north bridge 906 also provides an interface to the random access memory ("RAM") 914 and, possibly, an on-board graphics adapter 908. The north bridge 906 may also include functionality for providing networking functionality through a network adapter such as the gigabit Ethernet adapter 912. The gigabit Ethernet adapter 912 is capable of connecting the computer 900 to other computers via a network. Connections which may be made by the adapter 912 include local area network ("LAN"), wide area network ("WAN") connections, and other types of network connections. LAN and WAN networking environments are commonplace in offices, enterprise-wide computer networks, intranets, and the Internet. The north bridge 906 is connected to the south bridge 910.

The south bridge 910 is responsible for controlling many of the input/output functions of the computer 900. In particular, the south bridge 910 may provide one or more universal serial bus ("USB") ports 916, a sound adapter 924, a network adapter, such as the Ethernet controller 934, and one or more general purpose input/output ("GPIO") pins 918. The south bridge 910 may also provide a bus for interfacing peripheral card devices such as a graphics adapter 930. In one implementation, the bus comprises a peripheral component interconnect ("PCI") bus. The south bridge 910 may also provide a system management bus 932 for use in managing the various components of the computer 900. Power management circuitry 926 and clock generation circuitry 928 may also be utilized during the operation of the south bridge 910.

The south bridge 910 is also operative to provide one or more interfaces for connecting mass storage devices to the computer 900. For instance, the south bridge 910 may include a serial advanced technology attachment ("ATA") adapter for providing one or more serial ATA ports 920 and an ATA 100 adapter for providing one or more ATA 100 ports 922. The serial ATA ports 920 and the ATA 100 ports 922 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 910, and its associated computer-readable media, provide non-volatile storage for the computer 900. Although the description of computer-readable media contained herein refers to a mass storage device, such as a hard disk or CD-ROM drive, it should be appreciated by those skilled in the art that computer-readable media can be any available media that can be accessed by the computer 900. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 910 for connecting a "Super I/O" device 940. The Super I/O device 940 is responsible for providing a number of input/output ports, including a keyboard port, a mouse port, a serial interface, a parallel port, and other types of input/output ports. The Super I/O device 940 may also include a controller for controlling the operation of a removable disk device 942, such as a floppy disk drive. A disk 944 comprising a computer-readable medium may be utilized in conjunction with the removable disk device 942 to provide removable data storage and retrieval for the computer 900.

The LPC interface may also connect a read-only memory ("ROM") device for storing a firmware 936, such as an extensible firmware interface ("EFI") compatible firmware or a BIOS firmware that includes program code containing the basic routines that help to start up the computer 900 and to transfer information between elements within the computer 900. The LPC interface may also be utilized to connect a non-volatile random access memory ("NVRAM") 938 to the computer 900. The NVRAM 938 may be utilized by the firmware 936 to store configuration data for the computer 900.

As described briefly above, it should be appreciated that the computer 900 may comprise other types of computing devices, including hand-held computers, embedded computer systems, personal digital assistants, and other types of computing devices known to those skilled in the art. It is also contemplated that the computer 900 may not include all of the components shown in FIG. 9, may include other components that are not explicitly shown in FIG. 9, or may utilize an architecture completely different than that shown in FIG. 9.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims. The various subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for determining the level of availability of a computing resource, the method comprising:
    collecting data relating to the availability of the computing resource;
    determining whether a start event occurred without a corresponding stop event;
    processing the collected data to determine an outage time for the computing resource during a period of time by computing the outage time as the time equal to the time period between the end of a previous time period and the time of the start event in response to determining that a start event occurred without a corresponding stop event; and
    calculating the level of availability for the computing resource during the period of time based upon the determined outage time.

2. The method of claim 1, wherein the data relating to the availability of the computing resource comprises data identifying a start event indicating that the computing resource became available.

3. The method of claim 2, wherein the data relating to the availability of the computing resource further comprises data identifying a stop event indicating that the computing resource became unavailable.

4. The method of claim 3, wherein processing the collected data to determine the outage time for the computing resource during a period of time comprises determining an amount of time between one or more stop events and one or more start events for the computing resource during the period of time.

5. The method of claim 4, wherein processing the collected data to determine the outage time for the computing resource during a period of time further comprises:
    determining whether a stop event occurred without a corresponding start event; and
    in response to determining that a stop event occurred without a corresponding start event, computing the outage time as the time period between the stop event without a corresponding start event and the end of a current time period.

6. The method of claim 4, further comprising in response to determining that a stop event occurred without a corresponding start event, marking the stop event without a corresponding start event so that outage due to the stop event may be computed in one or more future time periods.

7. The method of claim 4, wherein collecting data relating to the availability of the computing resource comprises executing a monitoring and collection agent at the computing resource, the agent operative to monitor and collect event data at the computing resource relating to the availability of the computing resource.

8. The method of claim 4, further comprising:
    receiving a request for a report containing the results of the availability calculation;
    in response to the request, determining a date region for formatting date values contained in the report;
    formatting date values in the report according to the determined date region; and
    providing the report in response to the request.

9. A computer-readable medium having computer-executable instructions stored thereon which, when executed by a computer, cause the computer to:
    determine whether a start event occurred without a corresponding stop event;
    determine an outage time for a computing resource by determining an amount of time between one or more stop events and one or more start events for the computing resource during a period of time, wherein the outage time is computed as the time equal to the time period between a previous availability calculation and the time of the start event in response to determining that a start event occurred without a corresponding stop event; and
    calculate a level of availability for the computing resource during the period of time based upon the determined outage time.

10. The computer-readable medium of claim 9, comprising further computer-executable instructions which, when executed by the computer, cause the computer to:
    determine whether a stop event occurred without a corresponding start event; and
    in response to determining that a stop event occurred without a corresponding start event, to compute the outage time as the time period between the stop event without a corresponding start event and the end of a current time period.

11. The computer-readable medium of claim 10, comprising further computer-executable instructions which, when executed by the computer, cause the computer to:
    determine whether no start or stop events for the computing resource occurred during the time period;
    in response to determining that no start or stop events occurred for the computing resource during the time period, to determine whether a monitoring agent for the computing resource was operating during the time period;
    in response to determining that the agent was operating during the time period, setting the outage time for the time period to zero; and
    in response to determining that the agent was not operating during the time period, setting the outage time for the time period equal to the entire time period.

12. The computer-readable medium of claim 11, comprising further computer-executable instructions which, when executed by the computer, cause the computer to:
    receive a request for a report containing the results of the availability calculation;

in response to the request, to determine a date region for formatting date values contained in the report;

format date values in the report according to the determined date region; and provide the report in response to the request.

13. A method for determining the level of availability of a computing resource, the method comprising:

collecting data relating to the availability of the computing resource;

determining whether no start or stop events for the computing resource occurred during the time period;

in response to determining that no start or stop events occurred for the computing resource during the time period, determining whether the agent for the computing resource was operating during the time period;

processing the collected data to determine an outage time for the computing resource during a period of time by setting the outage time for the time period to zero in response to determining that the agent was operating during the time period and setting the outage time for the time period equal to the entire time period in response to determining that the agent was not operating during the time period; and calculating the level of availability for the computing resource during the period of time based upon the determined outage time.

14. The method of claim 13, wherein the data relating to the availability of the computing resource comprises data identifying a start event indicating that the computing resource became available.

15. The method of claim 14, wherein the data relating to the availability of the computing resource further comprises data identifying a stop event indicating that the computing resource became unavailable.

16. The method of claim 15, wherein processing the collected data to determine the outage time for the computing resource during a period of time comprises determining an amount of time between one or more stop events and one or more start events for the computing resource during the period of time.

17. The method of claim 16, wherein processing the collected data to determine the outage time for the computing resource during a period of time further comprises:

determining whether a stop event occurred without a corresponding start event; and in response to determining that a stop event occurred without a corresponding start event, computing the outage time as the time period between the stop event without a corresponding start event and the end of a current time period.

18. The method of claim 16, further comprising in response to determining that a stop event occurred without a corresponding start event, marking the stop event without a corresponding start event so that outage due to the stop event may be computed in one or more future time periods.

19. The method of claim 16, wherein collecting data relating to the availability of the computing resource comprises executing a monitoring and collection agent at the computing resource, the agent operative to monitor and collect event data at the computing resource relating to the availability of the computing resource.

20. The method of claim 16, further comprising:

receiving a request for a report containing the results of the availability calculation;

in response to the request, determining a date region for formatting date values contained in the report;

formatting date values in the report according to the determined date region; and providing the report in response to the request.

* * * * *